…

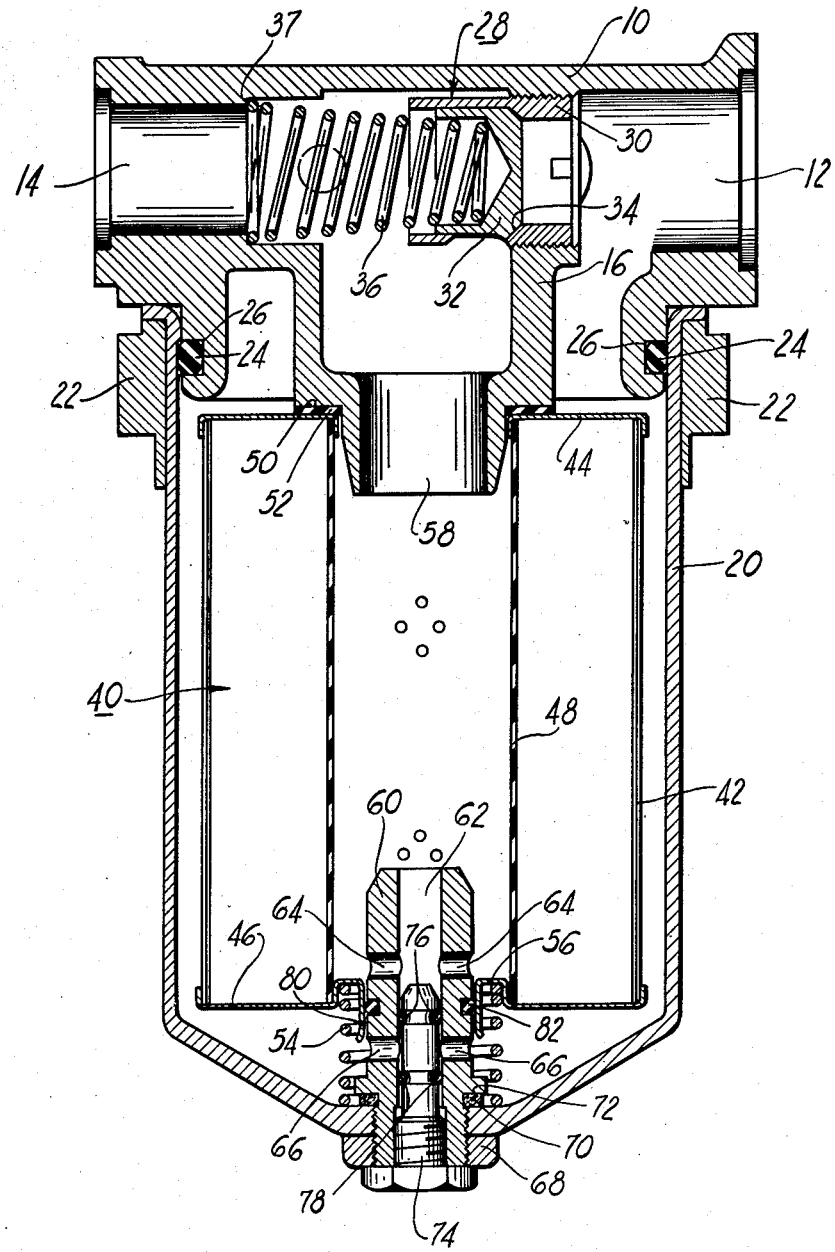

United States Patent Office 2,693,281
Patented Nov. 2, 1954

2,693,281

FILTER

Hans P. Winzen, Detroit, Mich., assignor to Bendix Aviation Corporation, South Bend, Ind., a corporation of Delaware Application March 17, 1950, Serial No. 150,137

5 Claims. (Cl. 210—165)

The present invention relates to fluid purifying devices such as filters for removing foreign materials from lubricants, fuel oil, gasoline and the like, and more particularly to the aforesaid devices in which a means is provided for readily draining the compartments thereof for cleaning.

In conventional filtering devices having a fluid bowl and a hollow filter element therein, the element may become heavily coated with foreign matter so that, when the device is drained in preparation for cleaning, the fluid in the hollow interior of the element does not drain out readily or completely, perhaps leaving a small amount of fluid which may be spilled when the bowl is removed. It is, therefore, one of the objects of the present invention to provide a simple means in the aforesaid devices which will permit the fluid to readily drain not only from the filter bowl, but from the hollow interior of the filter element even though it may be coated heavily with foreign materials.

Another object of the invention is to provide a filtering device having a hollow filter element and a bowl surrounding the element wherein a means is provided for draining the bowl and hollow interior of the element simultaneously by the removal of a single plug or cap.

Still another object of the invention is to provide a filtering device of the aforesaid type having a means for supporting the filter element in operative position in the device combined with a means for draining the filter element and simultaneously draining the fluid passages of the device.

Further objects and advantages of the present invention will become apparent from the following description and accompanying drawing wherein a vertical cross-section of my filtering device is shown with the several parts thereof assembled in operative relationship.

Referring more specifically to the drawing, numeral 10 designates a filter head in which are provided a fluid inlet passage 12 and a fluid outlet passage 14 separated from one another in the filter head by a circular-shaped wall 16 formed integrally with the internal portion of the head. The inlet and outlet passages are provided with an annular recess for receiving suitable fittings for installation of the device in a fuel or lubrication line or the like. Suitable brackets (not shown), preferably formed integrally with the head, are provided for mounting the filter on an engine or other mechanism. A bowl 20 extends downwardly from the lower side of the head 10 and is secured in place by a ring 22 bolted to said head. A gasket 24 inserted in an annular groove 26 in the lower portion of the head is provided for sealing the bowl to the head in fluid-tight relationship. A by-pass 28 which is provided in the filter head to permit the fluid to pass directly from the inlet passage 12 to the outlet passage 14 when the filter element becomes clogged with dirt consists of a sleeve 30 threadedly received in an opening in wall 16, a piston 32 adapted to reciprocate in said sleeve and to seat on a beveled annular surface or shoulder 34 and a coil spring 36 reacting between said piston and a shoulder 37 in the fluid outlet passage for urging said piston onto its seat. Piston 32 is adapted to move to the left (as shown in the drawing) in opposition to spring 36 when a predetermined differential in pressure across the filter element is reached.

The filter element, generally designated by numeral 40, consists of vertically pleated side walls 42 of resinous impregnated paper, annular plates 44 and 46 cemented to said side walls at the top and bottom, respectively, and a perforated tube 48 which, together with said plates, gives rigidity to the element and holds it in its cylindrical shape. The element seats on an annular shoulder 50, on which a gasket 52 may be placed to provide a seal, and is held in place by a coil spring 54 reacting between the bottom of the bowl and an internal flange 56 on plate 46. A downwardly extending annular projection 58 of filter head 10 is provided to retain the element in alignment with the entrance of the fluid outlet.

The fluid is rapidly drained from the hollow interior of the filter element and the fluid bowl simultaneously by an arrangement consisting of a stem 60 having a longitudinal bore 62 therethrough connected by ports 64 with the internal portion of the filter element and by ports 66 with the fluid bowl. The stem is threadedly secured in a centrally located hole in the bottom of the bowl and is locked in place by a nut 68 threaded on to the lower end of said stem. A gasket 70 is disposed between a shoulder 72 on the stem and the bottom of the bowl to provide a fluid-tight seal between said members. A single plug 74 with gaskets 76 and 78 closes bore 62 both between ports 64 and 66 and between ports 66 and the lower end or outlet of said bore, thus preventing communication through the said bore between the hollow interior of the filter element and the bowl and between the bowl and the outlet.

The stem, in addition to serving as a drain for the bowl and filter element, functions as a support or guide for the element. Flange 56 is provided with an annular overturned edge 80 which is adapted to slip over stem 60 and engage gasket 82 and to retain the lower end of the filter element in proper alignment in the bowl.

In the operation of the filter shown on the drawing, fluid such as fuel or oil enters the inlet passage 12, passes downwardly into the bowl around the filter element 40, thence through the filter element into the hollow interior and passes upwardly and out through outlet passage 14. As the filter continues to operate, foreign matter such as solid particles, sludge and the like, accumulates on the external surface of the filter element, gradually decreasing the permeability thereof until the differential in pressure across the element increases sufficiently to open by-pass 28 by urging piston 32 to the left in opposition to spring 36.

When the filtering device is to be cleaned, plug 74 is removed from stem 60, thereby opening bore 62 to permit the fluid in the hollow interior of the filter element to flow therefrom through ports 64 and said bore and to permit the fluid to flow from the bowl through ports 66 and the bore. By this arrangement, the fluid readily drains from both the bowl and the hollow interior of the filter element irrespective of the accumulated foreign matter on the surface of the filter element.

Although only one embodiment of the invention has been illustrated herein, various changes or modifications in the arrangement of the filtering device and parts thereof may be made to suit requirements.

I claim:

1. A fluid filtering device comprising a hollow cylindrically-shaped filter element, a hollow cylindrical member engaging the upper end of said element, a bowl enclosing said element, a stem supporting and engaging the lower end of said element extending through the bottom of said bowl into the hollow interior of said element and having a longitudinal bore therein communicating with said bowl and the interior of said element and opening externally of said device, and a removable plug in said bore closing said external opening and said bore between said bowl and the interior of said element.

2. A fluid filtering device comprising a head having a fluid inlet passage and a fluid outlet passage, a bowl connecting said inlet and outlet passages, a cylindrically-shaped filter element having a longitudinal fluid passage therethrough seating over the entrance to said outlet passage, a projection around the entrance to said outlet passage extending into one end of the element passage thereby retaining said element in alignment with said entrance, a stem mounted in the bottom of said bowl supporting said element and extending into the other end of said element passage, said stem having a longitudinal bore therethrough, a port connecting said bore with said element passage and a port connecting said bore with said bowl, and a removable plug closing said bore between said ports.

3. A fluid filtering device as set forth in claim 2 having a spring about said stem adapted to urge said element onto its seat.

4. A fluid purifying device comprising a head having a fluid inlet passage and a fluid outlet passage, a bowl connecting said inlet and outlet passages, a cylindrically-shaped element having a longitudinal fluid passage therethrough, a projection around the entrance to said outlet passage extending into one end of the element passage and retaining said element in alignment with said entrance, a stem mounted in the bottom of said bowl extending into the other end of said element passage, said stem having a longitudinal bore therethrough opening externally of said device and passages intersecting said bore communicating with said element passage and with said bowl, and a removable plug in said bore closing said external opening and blocking communication between said element passage and said bowl.

5. A fluid purifying device comprising a bowl and an element having an internal chamber disposed in said bowl, a hollow cylindrical member engaging the upper end of said element, a stem supporting and engaging the lower end of said element extending through the bottom of said bowl into said chamber, said stem having a longitudinal bore therethrough opening externally of said device, a port connecting said bore with said chamber, a port connecting said bore with said bowl, and a removable plug sealing said external opening and said bore between said ports.

References Cited in the file of this patent

UNITED STATES PATENTS

| Number | Name | Date |
|---|---|---|
| 1,675,378 | Pearson | July 3, 1928 |
| 1,910,553 | Lentz | May 23, 1933 |
| 1,953,759 | Hurst | Apr. 3, 1934 |
| 2,188,643 | Laderer | Jan. 30, 1940 |
| 2,471,069 | Le Clair | May 24, 1949 |
| 2,544,244 | Vokes | Mar. 6, 1951 |
| 2,544,269 | Le Clair | Mar. 6, 1951 |
| 2,615,573 | Storey | Oct. 28, 1952 |

FOREIGN PATENTS

| Number | Country | Date |
|---|---|---|
| 505,271 | Great Britain | Aug. 3, 1937 |